(12) United States Patent
Desurvire

(10) Patent No.: US 6,327,061 B1
(45) Date of Patent: *Dec. 4, 2001

(54) OPTICAL FIBER TRANSMISSION SYSTEM FOR SOLITON SIGNALS WITH WAVELENGTH MULTIPLEXING AND SATURABLE ABSORBERS

(75) Inventor: Emmanuel Desurvire, Bruyeres le Chatel (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/089,378

(22) Filed: Jun. 3, 1998

(30) Foreign Application Priority Data

Jun. 5, 1997 (FR) .................................. 97 06969

(51) Int. Cl.[7] ...................................... H04J 14/02
(52) U.S. Cl. .......................... 359/124; 359/173; 359/125; 359/126; 359/127; 359/130; 359/132; 359/133; 359/134; 359/158; 359/161
(58) Field of Search .................................. 359/124–134, 359/173, 161, 158

(56) References Cited

U.S. PATENT DOCUMENTS

| | | | | |
|---|---|---|---|---|
| 5,548,433 | * | 8/1996 | Smith | 359/158 |
| 5,642,215 | * | 6/1997 | Suzuki et al. | 359/161 |
| 5,684,615 | * | 11/1997 | Blow et al. | 359/173 |
| 5,726,787 | * | 3/1998 | Haus et al. | 359/161 |
| 5,737,110 | * | 4/1998 | Suzuki et al. | 359/161 |
| 5,799,024 | * | 8/1998 | Bowers et al. | 372/11 |
| 5,801,862 | * | 9/1998 | Desurvire et al. | 359/124 |
| 5,805,327 | * | 9/1998 | Usami et al. | 359/244 |
| 6,005,702 | * | 12/1999 | Suzuki et al. | 359/183 |
| 6,011,638 | * | 1/2000 | Mamyshev et al. | 359/179 |
| 6,091,536 | * | 7/2000 | Usami et al. | 359/244 |
| 6,097,524 | * | 8/2000 | Doran et al. | 359/179 |

OTHER PUBLICATIONS

D. Atkinson et al, Increased Amplifier Spacing in a Soliton System with Quantum–Well Saturable Absorbers and Spectral Filtering, Optics Letters, vol. 19, No. 1, Oct. 1, 1994, pp. 1514–1516.

R. J. Essiambre et al, Control of Soliton–Soliton and Soliton–Dispersive Wave Interactions in High Bit–Rate Communications Systems, Electronics Letters, vol. 13, No. 17, Aug. 17, 1995, pp. 1461–1463.

M. Matsumoto et al, "Stable Soliton Transmission in the System with Nonlinear Gain", Journal of Light–Wave Technology, vol. 13, No. 4, Apr. 1, 1995, pp. 658–665.

O. Leclerc et al, "Assessment of 80Gbit/s (4x20Gbit/s) Regenerated WDM Soliton Transoceanic Transmission", Electronics Letters, vol. 32, No. 12, Jun. 6, 1996, pp. 1118–1119.

* cited by examiner

Primary Examiner—Leslie Pascal
Assistant Examiner—Hanh Phan
(74) Attorney, Agent, or Firm—Sughrue, Mion, Zinn, Macpeak & Seas, PLLC

(57) ABSTRACT

An optical fiber transmission system for soliton signals with wavelength multiplexing in which the bit times of the various channels $\lambda_1$ to $\lambda_n$ of the multiplex are substantially synchronous, at least at one point. At least one saturable absorber is located at this point. The channels can be made synchronous by an appropriate selection of wavelengths, or by using optical delay lines, or the like. The saturable absorber then modulates the intensity of the soliton signals in the various channels of the multiplex. It is possible to use a clock for remotely driving the saturable absorber. The invention also relates to a corresponding transmission method. The invention makes it possible to transmit over long distances without using active components.

26 Claims, 1 Drawing Sheet

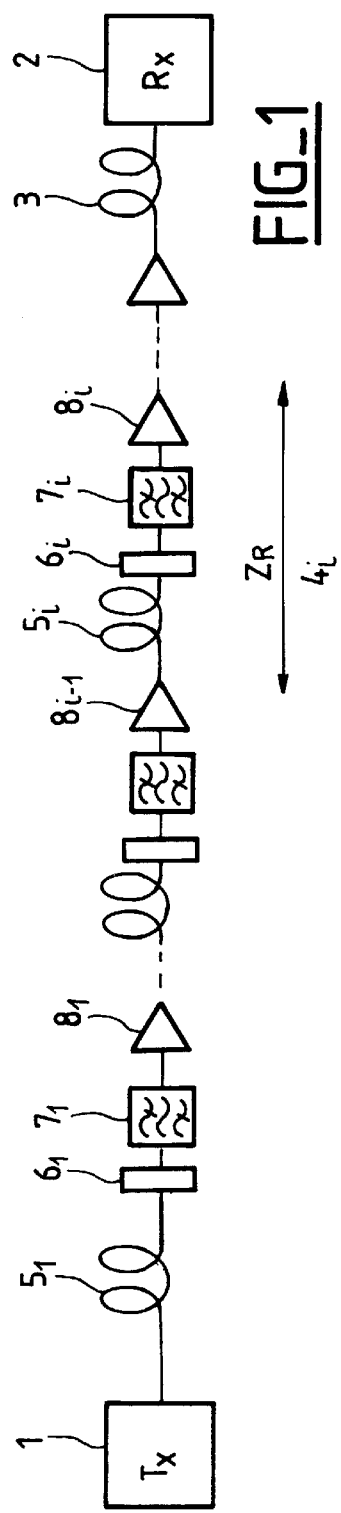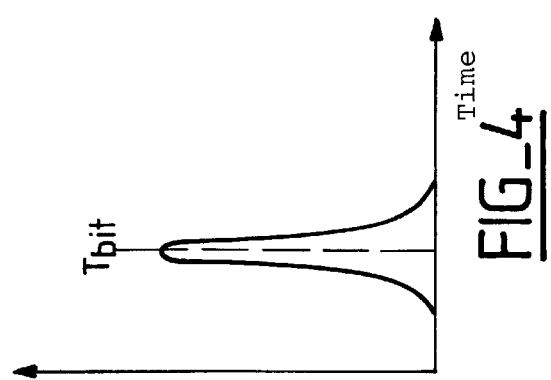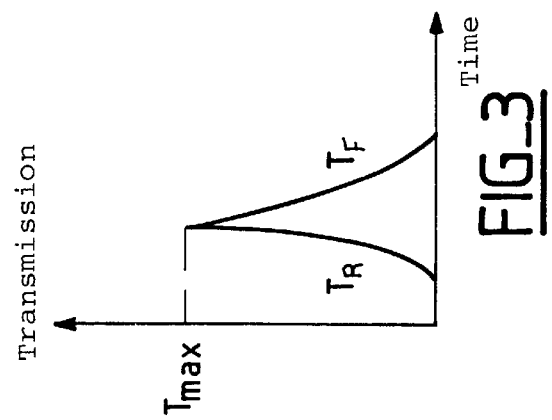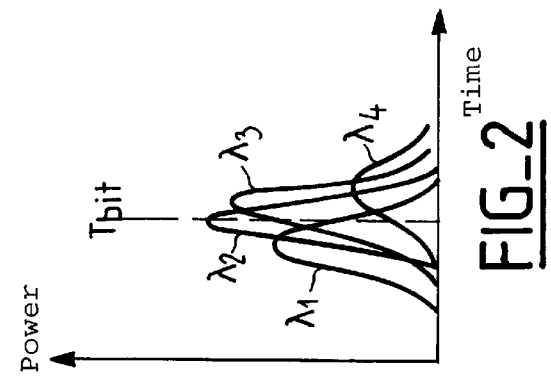

OPTICAL FIBER TRANSMISSION SYSTEM FOR SOLITON SIGNALS WITH WAVELENGTH MULTIPLEXING AND SATURABLE ABSORBERS

FIELD OF THE INVENTION

The present invention relates to an optical fiber transmission system for soliton signals with wavelength multiplexing, in which the various wavelengths of the multiplex are selected to ensure relative slip between the various channels that is substantially equal, over a given distance, to a multiple of the bit time.

The invention also provides a method of transmission in such a system.

BACKGROUND OF THE INVENTION

The transmission of soliton pulses or "solitons" in the portion of an optical fiber that has abnormal dispersion is a known phenomenon. Solitons are pulse signals of $\text{sech}^2$ form. With a pulse of this form, the non-linearity of the corresponding portion of the fiber compensates for the dispersion in the optical signal. Soliton transmission is modelled in known manner by means of the non-linear Schrödinger equation.

Various effects put a limit on the transmission of such pulses, such as the jitter induced by interaction of solitons with the noise present in a transmission system, as described for example in the article by J. P. Gordon and H. A. Haus, published in Optical Letters, Vol. 11, No. 10, pages 665–667. This effect which is known as the "Gordon-Haus effect" or as "Gordon-Haus jitter" puts a theoretical ceiling on the quality of soliton transmission or on its data rate. Another limit is imposed by amplitude fluctuations due to amplifier noise.

To overcome these limits, it is possible to use synchronous modulation with soliton signals, by means of semiconductor modulators. That technique puts an intrinsic limit on the data rate of a soliton link, because of the upper limit on the passband of semi-conductor modulators. Proposals have also been made for systems having sliding guiding filters enabling the jitter of transmitted solitons to be controlled, see for example EP-A-0 576 208.

For the purpose of regenerating the signal on a line, proposals have also been made to use the Kerr effect in synchronous amplitude or phase modulators of the interferometer type. These techniques require high frequency components to be used, thus demonstrating the advantage of all-optical approaches. In terms of cost, this approach is limited firstly by the number of in-line modulators that are required, together with their associated electronics, and secondly, in the intended undersea applications, by the need to have components of appropriate quality rating.

Finally, to regenerate soliton signals, Proposals have been made to use saturable absorbers. That solution is subject to three limitations. Firstly, the time response of saturable absorbers does not appear to be fast enough for high data rate applications; secondly saturable absorbers do not control jitter as effectively as synchronous modulation; and finally saturable absorbers do not appear to be compatible with propagation using wavelength multiplexing, because of the lack of synchronism between channels.

An article by D. Atkinson et al., Optics Letters, Vol. 19, No. 19, pages 1514–1516 decribes a theoretical simulation of a soliton signal transmission with quantum-well saturable absorbers and spectral filtering. In that article, it is shown that it is theoretically possible to transmit non-multiplexed soliton signals over a distance of 9000 km with regenerators that are regularly spaced apart at intervals of 100 km. Each regenerator comprises an amplifier, a multiple quantum well (MQW) saturable absorber, and a narrow band filter. The article specifies that the absorption spectra of MQWs limit their usefulness in wavelength-multiplexed systems. It is only suggested that certain saturable absorber materials could, in principle, present a special wavelength and thus be compatible with wavelength multiplexing.

An article by R. J. Essiambre and G. P. Agrawal, J. Opt. Soc. Am. B/Vol. 12, No. 12, pages 2420–2425 proposes a theoretical description of a short soliton signal transmission system under quasi-adiabatic propagation conditions. The simulated transmission system has regenerators including a limited-bandwidth amplifier, a fast saturable absorber, and where appropriate, a frequency filter. The article explains that the saturable absorber makes it possible to reduce resonance instabilities, and prevents secondary solitons being produced. More precisely, the article proposes compensating Raman diffusion within each pulse, which gives rise to the frequency of a soliton being shifted downwards, by an upward frequency shift in each regenerator. That solution cannot be transposed to wavelength-multiplexed transmission systems, given the importance of narrow bandwidth for the amplifiers, and the relationships between soliton frequency and spacing between repeaters.

Also, to increase the data rate of optical fiber transmission systems using soliton signals, proposals have also been made to use wavelength division multi-plexing (WDM). Under such circumstances, it is believed to be advantageous to use sliding guiding filters of the Fabry Perot type, which are fully compatible with wavelength-multiplexed signals. In contrast, the use of synchronous modulators or of saturable absorbers for regenerating wavelength-multiplexed soliton signals is problematic because of the difference in group velocity between the signals in the various channels.

An article by E. Desurvire, O. Leclerc, and O. Audouin, Optics Letters, Vol. 21, No. 14, pages 1026–1028 describes a scheme for allocating wavelengths that is compatible with using synchronous modulators. That article proposes giving wavelengths to different channels of the multiplex in such a manner that for repeaters at given spacing, the signals in the various channels, or more precisely the bit times of the various channels of the multiplex, are substantially synchronized on reaching the repeaters. This makes synchronous in-line modulation of all of the channels possible at given intervals by means of discrete synchronous modulators. A more detailed article describes the various ways in which wavelengths can be allocated in the more general case, i.e. with or without dispersion slope compensation (O. Leclerc, E. Desurvive, and O. Audouim, Optical Fiber Technologies, Vol. 3, No. 2, April 1997, Academic Press, 1997). The general technique of allocating wavelengths in the multiplex is also described in French patent application 96/00732 of Jan. 23, 1996 (corresponding to U.S. Pat. No. 5,801,862) in the name of Alcatel Submarine Networks.

Other methods or apparatuses, for example those described in French patent application 97/01476 of Feb. 10, 1997 (corresponding to U.S. patent application Ser. No. 09/155,901) in the name of Alcatel Alsthom Compagnie Générale d'Electricité make it possible to achieve the same result, i.e. bit time synchronization of the various channels in the multiplex at certain positions along the transmission system. In that patent application, it is proposed to use delay lines or equivalent devices to resynchronize the channels of the multiplex.

OBJECTS AND SUMMARY OF THE INVENTION

The present invention proposes a solution to the problem of modulating wavelength-multiplexed soliton signals that is original and simple. It makes it possible to avoid the above-mentioned drawbacks of synchronous modulation apparatuses.

More precisely, the invention provides an optical fiber transmission system for soliton signals with wavelength multiplexing, in which the bit times of the various channels $\lambda_1$ to $\lambda_n$ of the multiplex are substantially synchronous, at at least one point, wherein at least one saturable absorber is disposed at said point.

Advantageously, the working spectrum window of the saturable absorber covers all of the channels of the multiplex. It is possible to provide for the response time of the saturable absorber to be less than a small fraction of the bit time, preferably less than 10% of the bit time.

In an embodiment, the various wavelengths of the channels of the multiplex are selected so as to ensure relative slip between the various channels over a given interval $Z_R$ that is substantially equal to an integer multiple of the bit time 1/B, the system comprising at least two saturable absorbers that are spaced apart by a distance that is an integer multiple of said interval $Z_R$.

In this case, for each wavelength $\lambda_i$ of the multiplex, the difference $\delta\tau_i$ between the slip per unit length on the channel i and on the first channel satisfies the following relationship:

$$\left(k_i \cdot T - \frac{T}{4}\right) < \delta\tau_i \cdot Z_R < \left(k_i \cdot T + \frac{T}{4}\right)$$

where $k_i$ is an integer depending on the channel, and T is the bit time.

In another embodiment, the system comprises optical delay line synchronization means compensating the group time differences associated with the various channels so as to ensure that the channels are synchronous at least at said point.

It is possible to provide means for transmitting a clock or for recovering a clock in the transmission system, the power of the clock being selected so as to ensure that said saturable absorber is completely or nearly completely saturated during the clock pulses.

Advantageously, the clock is formed by a periodic series of solitons each having a time width lying in the range 0.20 times to 0.33 times the signal period.

In addition, the saturable absorber comprises a saturable gain amplifier, preferably a semiconductor amplifier.

The system may also present means for transmitting a black clock or means for recovering a black clock in the transmission system, the power of the black clock being selected so as to ensure that the gain of the amplifier is completely or nearly completely saturated outside clock pulses.

Advantageously, the black clock is formed by a periodic series of black solitons each having a time width lying in the range 0.20 times to 0.33 times the signal period.

The invention also provides a transmission method in an optical fiber system for transmitting soliton signals with wavelength multiplexing, in which the bit times of the various channels $\lambda_1$ to $\lambda_n$ of the multiplex are substantially synchronous at at least one point, the method including at least one step of synchronously modulating the signals of the multiplex channels by means of a saturable absorber disposed at said point.

Advantageously, the working spectrum window of the saturable absorber covers all of the channels of the multiplex.

The response time of the saturable absorber may be less than a small fraction of the bit time, and preferably less than 10% of the bit time.

In an implementation, the various wavelengths of the channels of the multiplex are selected so as to ensure relative slip between the various channels over a given interval $Z_R$ substantially equal to an integer multiple of the bit time 1/B, and the method comprises at least steps of performing regeneration by means of saturable absorbers that are separated by distances that are integer multiples of said interval $Z_R$.

In which case, for each wavelength $\lambda_i$ of the multi-plex, the difference $\delta\tau_i$ between the slip per unit length on the channel i and on the first channel satisfies the following relationship:

$$\left(k_i \cdot T - \frac{T}{4}\right) < \delta\tau_i \cdot Z_R < \left(k_i \cdot T + \frac{T}{4}\right)$$

where $k_i$ is an integer depending on the channel, and T is the bit time.

In another implementation, the method includes at least one step of synchronizing the bit times of the various channels of the multiplex by optical delay line synchronization means compensating the group time differences associated with the various channels.

The method preferably also includes transmitting a clock or recovering a clock in the transmission system, the power of the clock being selected so as to ensure that said saturable absorber is completely or nearly completely saturated during the clock pulses.

In which case, the clock is formed by a periodic series of solitons each having a time width lying in the range 0.20 times to 0.33 times the signal period.

Provision may be made for the saturable absorber to comprise a saturable gain amplifier, preferably a semiconductor amplifier.

In which case, the method of the invention advantageously comprises transmitting a black clock or recovering a black clock in the transmission system, the power of the black clock being selected so as to ensure that the gain of the amplifier is completely or nearly completely saturated outside the clock pulses.

Preferably, the black clock is formed by a periodic series of black solitons, each having a time width lying in the range 0.20 times to 0.33 times the signal period.

BRIEF DESCRIPTION OF THE DRAWING

Other characteristics and advantages of the invention appear on reading the following description of embodiments given by way of example and with reference to the accompanying drawing, in which:

FIG. 1 is a diagram of an optical transmission system constituting a first embodiment of the invention;

FIG. 2 shows the appearance of soliton signals on four channels in the system of FIG. 1, on reaching a regenerator;

FIG. 3 shows the appearance of transmission as a function of time through a saturable absorber regenerator of the invention; and FIG. 4 shows the appearance of the soliton signals of FIG. 2 after passing through the regenerator of FIG. 3.

MORE DETAILED DESCRIPTION

The invention proposes using saturable absorbers in an optical fiber transmission system for soliton signals using wavelength multiplexing, in which the soliton channels are synchronized at at least one point, and are preferably synchronized at regular intervals; for this purpose, it is possible to use the wavelength allocation schemes or the delay lines that are described above. More generally, it is possible to use any scheme which ensures that the channels are synchronized at the modulation point.

Insofar as the channels are synchronized, the saturable absorber can regenerate the signals in the various channels without it being necessary to provide demultiplexing. Since the data rate of a channel is less than the data rate of the link, the problem of the response time of the saturable absorber is no longer such a constraint. The response time is merely advantageously less than some small fraction, e.g. 10%, of the bit time of the signal.

To implement the invention, it is possible to select a wavelength allocation scheme that ensures, at regular intervals $Z_R$ along a fiber, that the relative slip between the various channels is substantially equal to an integer multiple of the bit time. For each channel, this can be expressed by the following formula:

$$\left(k_i \cdot T - \frac{T}{4}\right) < \delta\tau_i \cdot Z_R < \left(k_i \cdot T + \frac{T}{4}\right)$$

where T is the bit time, $k_i$ is an integer depending on the channel, and $\delta\tau_i$ slip of channel i relative to channel 1. This formula represents the fact that at intervals $Z_R$, the offsets between the various channels caused by slip are, to within one-fourth of a bit time, integer multiples of the bit time. This ensures exact or almost exact coincidence between the bit times and an interval $Z_R$, insofar as the bit times coincide exactly or nearly exactly on emission.

In particular, it is possible to use the wavelength allocation schemes described in the above-mentioned articles by E. Desurvire et al. and by O. Leclerc et al., to which reference can be made for further details on this subject. Naturally, other wavelength allocation schemes, or indeed the use of delay lines, are possible and make it possible to achieve the same results in terms of synchronism between the various channels of the multiplex.

FIG. 1 shows a first embodiment of the invention in which saturable absorbers are used for optical modulation, e.g. absorbers based on semiconductor materials or on a fiber that is highly non-linear. The transmission system of FIG. 1 comprises an emitter Tx 1, a receiver Rx 2 connected to the length of fiber 3, and n segments $4_i$ for i=1 to n. The emitter 1 emits soliton pulses into the first segment i=1, which pulses are in the various channels of a wavelength multiplex and are at wavelengths $\lambda_1$ to $\lambda_n$. The various wavelengths are selected using a frequency allocations scheme that, for a given interval $Z_R$, gives rise to relative slip between the various channels that is substantially equal to an integer multiple of the bit time. The last segment i=n is connected to the fiber 3 which conveys the soliton pulses to the receiver 2.

Each segment $4i$ comprises a length of fiber $5i$ whose outlet is connected to a saturable absorber $6_i$; the outlet from the saturable absorber constitutes the inlet to a filter $7_i$, whose outlet is connected to an amplifier $8_i$; the outlet from the amplifier is connected to the fiber $5_{i+1}$ of the following segment, or for segment n to the fiber 3. The length of a segment preferably corresponds to the interval $Z_R$, so as to make it possible, where necessary, to proceed with modulation at the end of each of the segments.

The saturable absorber can be selected from a variety of components: a free optical system or waveguide, semiconductor materials, e.g. quantum wells, or a cell or a fiber that is highly non-linear in transmission.

Advantageously, such saturable absorbers have a working spectrum window of several nanometers, so as to be able to cover the various channels of a wavelength multiplex.

The amplifier can be an amplifier of any known type, and for example it can be a doped fiber amplifier, such as an erbium-doped fiber amplifier (EDFA).

It is possible to provide a modulator device at each interval $Z_R$, i.e. in the case shown in FIG. 1, for each segment. It is clear that this is not essential. It is also possible to vary the relative positions of the amplifier $8_i$, of the saturable absorber $6_i$, and of the filter $7_i$ as will appear clearly to the person skilled in the art. It is also possible to vary the number of amplifiers, i.e. instead of providing one amplifier per segment, it is possible to provide more than one amplifier per segment. Similarly, depending on the nature of the link, it is possible to vary the numbers and the positions of the filters and/or of the saturable absorbers.

FIG. 2 is a diagram showing power as a function of time for various soliton signals on four channels $\lambda_1$ to $\lambda_4$ on reaching a saturable absorber. As shown in FIG. 2, and as explained above, the various signals have respective relative time shifts, and they do not reach the saturable absorber at exactly the same time, firstly because of the jitter affecting the various soliton pulses, and secondly because of slack in the constraint for synchronism between the various channels.

FIG. 3 shows the transmission response of a saturable absorber that receives the various soliton signals of FIG. 2, with transmission being plotted up the ordinate as a function of time along the abscissa. The saturable absorber is selected so as to present a working spectrum window that covers all of the wavelengths of the multiplex.

FIG. 4 shows the effect on the soliton pulses of FIG. 2 of passing through the saturable absorber of FIG. 3. As can be seen from the figure, the response of the saturable absorber represents non-linear averaging of all of the pulses present in each of the channels at the various wavelengths. The averaging is non-linear in that it depends on the sum of all of the incident powers. In the saturable absorber, this averaging effect induces a modulation envelope that is substantially centered on the bit time, with jitter that is significantly smaller than that of the various channels, because of the random or quasi-random distribution of jitter on the various channels. The intensity modulation induced by the saturable absorber on each of the channels produces on each channel a time recentering effect for its soliton pulses. The loss of power produced by the random lack of synchronization, i.e. by jitter, can be compensated by narrow band filtering or by guiding the soliton pulses, given the intrinsic properties of solitons, because of a well-known feedback effect.

The filtering can be guiding filtering, particularly when the system has a compensated dispersion slope, insofar as the dispersion is constant and synchronization between the various channels is conserved while being offset by the comb filter.

The configuration of FIG. 1 thus ensures that the soliton signals of the various channels are regenerated simultaneously, with this being due to the saturable absorbers.

In another embodiment of the invention, the saturable absorber is controlled by a pulsed clock having its carrier lying outside the band occupied by the multiplex signals, but inside the working spectrum window of the absorber. Such a clock serves to make the absorber transparent in a time window centered on the bit time, and this takes place regardless of which soliton signals are received. This is particularly advantageous when the number of channels is small, or if the density of transmitted 1s is small.

By way of example, it is possible to use a stream of non-coded solitons to provide the clock, with said solitons being of a width lying substantially in the range 0.20 times to 0.33 times the bit time, as explained in French patent application 96/12746, filed on Oct. 21, 1996 corresponding to U.S. Pat. No. 6,134,038 in the name of Alcatel Alsthom Compagnie Générale d'Electricité. In such a signal, interactions between solitons provide jitter compensation, such that the signal behaves like a clock.

Under such circumstances, the peak power of the clock or of the soliton stream is selected so as to ensure that the saturable absorber is completely or nearly completely saturated during periods that are centered on the clock pulses. For signal regeneration, this makes it possible to ignore the nature of the signals that are transmitted. This provides offset control of the modulation from emitter 1.

It would also be possible to emit such a modulating clock from the receiver terminal 2; such a configuration could be advantageous in particular when it is desirable to reduce interaction between the clock and the WDM signals that are propagating. In such a configuration, any line isolators can be short-circuited by means of dichroic couples or other analogous devices, in a manner similar to that which is used for offset amplification where an auxiliary fiber is used for conveying the pumping signal to the doped fiber segment situated in line.

In a third embodiment, the invention proposes saturable gain amplifiers (SGAs) instead of the saturable absorbers $5_i$ of FIG. 1, for example semiconductor amplifiers presenting said characteristic. Such semi-conductor amplifiers are well known per se to the person skilled in the art, they are independent of signal polarization, reliable, and also have fast saturation dynamics (less than 1 nanosecond). This makes it possible to ensure that the regenerators respond quickly, and also to provide a high data rate for each channel in the multiplex.

The response of such amplifiers can be controlled from one terminal or the other, in the same manner as a clock constituted by black solitons. Such a clock is described in above-mentioned French patent application 96/12746 and is constituted by an uninterrupted run of black solitons of width lying in the range 0.20 times to 0.33 times the bit time.

The effect of such a black clock is to saturate the gain of the amplifier outside its periods for receiving soliton pulses, i.e. outside the clock pulses, so as to ensure synchronous intensity modulation of the solitons of the multiplex. Using saturable gain amplifiers and a clock of this kind has the advantage that the clock can be transmitted in a portion of the optical fiber having normal dispersion, i.e. outside the spectrum window that is available for soliton signals.

The various embodiments of the invention have the advantage of providing synchronous regeneration of solitons in the transmission system while making use of "passive" type line components only, i.e. components that are not controlled by a radiofrequency signal, that are of reduced cost, and that can easily be made of a quality suitable for use in an undersea cable. The invention avoids problems associated with local clock recovery because it uses an offset clock, or when it uses saturable absorbers, because it has no clock. The invention makes it economically feasible to provide a transmission system with a short regeneration pitch, e.g. of the order of 100 km, thereby ensuring effective control over transmission quality.

Naturally, the present invention is not limited to the examples and embodiments described and shown, but can be modified in numerous ways by the person skilled in the art. Thus, even though this is not the presently preferred embodiment, it is clear that chocks of types other than those described above can be used, for example a clock obtained from the soliton signals of one of the various channels, e.g. by using clock recovery means such as a local voltage-controlled oscillator having a phase-locked loop, or any other conventional means. The scheme for allocating wavelengths is not limited in any way to the examples described. It should also be observed that compared with the embodiments described, it is possible to add or to remove filters or amplifiers, depending on requirements. Finally, the invention is described in the context of one-way transmission. Clearly, the invention is equally applicable to both-way transmission.

What is claimed is:

1. An optical fiber transmission system for soliton signals with wavelength multiplexing, said system comprising an optical fiber for carrying various channels $\lambda_1$ to $\lambda_n$ of the multiplex having bit times which are substantially synchronous at at least one point, said system further comprising at least one saturable absorber disposed at said point.

2. A transmission system according to claim 1, wherein the working spectrum window of the saturable absorber covers all of the channels of the multiplex.

3. A transmission system according to claim 1, wherein the response time of the saturable absorber is less than a small fraction of the bit time.

4. A transmission system according to claim 3, wherein the response time of the saturable absorber is less than 10% of the bit time.

5. A transmission system according to claim 1, wherein the various wavelengths of the channels of the multiplex are selected so as to ensure relative slip between the various channels over a given interval $Z_R$ that is substantially equal to an integer multiple of the bit time 1/B, the system comprising at least two saturable absorbers that are spaced apart by a distance that is an integer multiple of said interval $Z_R$.

6. A transmission system according to claim 5, wherein for each wavelength $\lambda_i$ of the multiplex, the difference $\delta\tau_i$ between the slip per unit length on the channel i and on the first channel satisfies the following relationship:

$$\left(k_i \cdot T - \frac{T}{4}\right) < \delta\tau_i \cdot Z_R < \left(k_i \cdot T + \frac{T}{4}\right)$$

where $k_i$ is an integer depending on the channel, and T is the bit time.

7. A transmission system according to claim 1, having optical delay line synchronization means compensating the group time differences associated with the various channels so as to ensure that the channels are synchronous at least at said point.

8. A transmission system according to claim 1, having means for transmitting a clock or for recovering a clock in the transmission system, the power of the clock being selected so as to ensure that said saturable absorber is completely or nearly completely saturated during the clock pulses.

9. A transmission system according to claim 8, wherein the clock is formed by a periodic series of solitons each having a time width lying in the range 0.20 times to 0.33 times the signal period.

10. A transmission system according to claim 1, wherein the saturable absorber comprises a saturable gain amplifier.

11. A transmission system according to claim 10, having means for transmitting a black clock or means for recovering a black clock in the transmission system, the power of the black clock being selected so as to ensure that the gain of the amplifier is completely or nearly completely saturated outside clock pulses.

12. A transmission system according to claim 11, wherein the black clock is formed by a periodic series of black solitons each having a time width lying in the range 0.20 times to 0.33 times the signal period.

13. A transmission system according to claim 10, wherein the saturable absorber comprises a semiconductor amplifier.

14. A transmission method in an optical fiber system for transmitting soliton signals with wavelength multiplexing, in which the bit times of the various channels $\lambda_1$ to $\lambda_n$ of the multiplex are substantially synchronous at at least one point, the method including at least one step of synchronously modulating the signals of the multiplex channels by means of a saturable absorber disposed at said point.

15. A transmission method according to claim 14, wherein the working spectrum window of the saturable absorber covers all of the channels of the multiplex.

16. A transmission method according to claim 14, wherein the response time of the saturable absorber is less than a small fraction of the bit time.

17. A transmission method according to claim 16, wherein the response time of the saturable absorber is less than 10% of the bit time.

18. A transmission method according to claim 14, wherein the various wavelengths of the channels of the multiplex are selected so as to ensure relative slip between the various channels over a given interval $Z_R$ substantially equal to an integer multiple of the bit time 1/B, and wherein said method comprises at least steps of performing regeneration by means of saturable absorbers that are separated by distances that are integer multiples of said interval $Z_R$.

19. A transmission method according to claim 18, wherein for each wavelength $\lambda_i$ of the multiplex, the difference $\delta\tau_i$ between the slip per unit length on the channel i and on the first channel satisfies the following relationship:

$$\left(k_i \cdot T - \frac{T}{4}\right) < \delta\tau_i \cdot Z_R < \left(k_i \cdot T + \frac{T}{4}\right)$$

where $k_i$ is an integer depending on the channel, and T is the bit time.

20. A transmission method according to claim 14, including at least one step of synchronizing the bit times of the various channels of the multiplex by optical delay line synchronization means compensating the group time differences associated with the various channels.

21. A transmission method according to claim 14, including the step of transmitting a clock or recovering a clock in the transmission system, the power of the clock being selected so as to ensure that said saturable absorber is completely or nearly completely saturated during the clock pulses.

22. A transmission method according to claim 21, wherein the clock is formed by a periodic series of solitons each having a time width lying in the range 0.20 times to 0.33 times the signal period.

23. A transmission method according to claim 14, wherein the saturable absorber comprises a saturable gain amplifier.

24. A transmission method according to claim 23, including the step of transmitting a black clock or recovering a black clock in the transmission system, the power of the black clock being selected so as to ensure that the gain of the amplifier is completely or nearly completely saturated outside the clock pulses.

25. A transmission method according to claim 24, wherein the black clock is formed by a periodic series of black solitons, each having a time width lying in the range 0.20 times to 0.33 times the signal period.

26. A transmission method according to claim 23, wherein the saturable absorber comprises a semiconductor amplifier.

* * * * *